(12) United States Patent
Birru (10) Patent No.: US 9,338,632 B2
(45) Date of Patent: May 10, 2016

(54) METHOD AND SYSTEM OF WIRELESS DEVICE DISCOVERY IN A WIRELESS NETWORK EMPLOYING DIRECTIONAL ANTENNAS

(75) Inventor: Dagnachew Birru, Yorktown Heights, NY (US)

(73) Assignee: KONINKLIJKE PHILIPS N.V.

( * ) Notice: Subject to any disclaimer, the term of this patent is extended or adjusted under 35 U.S.C. 154(b) by 1204 days.

(21) Appl. No.: 12/746,569

(22) PCT Filed: Dec. 18, 2008

(86) PCT No.: PCT/IB2008/055434
§ 371 (c)(1),
(2), (4) Date: Jun. 7, 2010

(87) PCT Pub. No.: WO2009/087521
PCT Pub. Date: Jul. 16, 2009

(65) Prior Publication Data
US 2010/0265990 A1  Oct. 21, 2010

Related U.S. Application Data

(60) Provisional application No. 61/020,016, filed on Jan. 9, 2008.

(51) Int. Cl.
H04L 27/00 (2006.01)
H04W 8/00 (2009.01)
H04B 7/06 (2006.01)

(52) U.S. Cl.
CPC ............. *H04W 8/005* (2013.01); *H04B 7/0613* (2013.01)

(58) Field of Classification Search
CPC .............................. H04B 7/0613; H04W 8/005
See application file for complete search history.

(56) References Cited

U.S. PATENT DOCUMENTS

2003/0048770 A1*  3/2003  Proctor, Jr. .................... 370/349
2003/0086366 A1*  5/2003  Branlund et al. ............. 370/208
(Continued)

FOREIGN PATENT DOCUMENTS

WO     WO03023895 A2     3/2003

OTHER PUBLICATIONS

Maxim Piz et al: "A Synchronization Scheme for OFDM-based 60 GHZ WPANS" IEEE International Symposium on Personal, Indoor and Mobile Radio Communications. PIMRC, IEEE; PI, XX, Sep. 1, 2007, pp. 1-5, XP031168162.
(Continued)

*Primary Examiner* — Kenneth Lam
(74) *Attorney, Agent, or Firm* — Larry Liberchuk (57) ABSTRACT

A wireless device (100) communicates in a wireless network, and executes a wireless device discovery process to discover other wireless devices (100) in the wireless network. In the wireless device discovery process, the wireless device (100) sets its antenna pattern to have an omnidirectional antenna pattern (202), and transmits a first packet (300) using the omnidirectional antenna pattern (202). The first packet (300) comprises a packet preamble sequence (310) formed by repeating each sample of a synchronization sequence N times (N>1). The remainder (320) of the first packet (300) is formed by spreading each sample thereof with a spreading factor P (P>1). For normal data communications, the wireless device (100) sets the antenna pattern to have a directional antenna pattern (204), and transmits a second packet using the directional antenna pattern (204).

12 Claims, 5 Drawing Sheets

(56) References Cited

U.S. PATENT DOCUMENTS

| | | | |
|---|---|---|---|
| 2006/0159058 A1* | 7/2006 | Johnson | 370/347 |
| 2007/0248195 A1* | 10/2007 | Lerner et al. | 375/343 |
| 2008/0080472 A1* | 4/2008 | Bertrand et al. | 370/344 |
| 2009/0125792 A1* | 5/2009 | Lakkis | 714/783 |

OTHER PUBLICATIONS

Toufik I et al "Multiuser Channel Allocation Algorithms Achieving Hard Fairness" Global Telecommunications Conference, 2004. Globecom '04. IEEE Dallas, TX, USA, Nov. 29-Dec. 3, 2004, Piscataway, NJ, USA,IEEE, vol. 1, Nov. 29, 2004, pp. 146-150, XP010758870.

Kalis A et al: "Relative Direction Determination in Mobile Computing Networks" IMTC 2001. Proceedings of the 18th. IEEE Instrumentation and Measurement Technology Conference. Budapest, Hungary, May 21-23, 2001; [IEEE Instrumentation and Measurement Technology Conference. (IMTC):], New York, NY : IEEE, US, vol. 3, May 21, 2001, pp. 1479-1484, XP010547207.

* cited by examiner

METHOD AND SYSTEM OF WIRELESS DEVICE DISCOVERY IN A WIRELESS NETWORK EMPLOYING DIRECTIONAL ANTENNAS

This invention pertains to the field of wireless communications, and more particularly to a system and method of wireless device discovery in a communication network wherein the wireless devices employ directional antennas.

In next-generation wireless communication networks, operating frequencies are in many cases much higher than in previous systems. For example, some of these networks operate at frequencies in the range of several GHz, or even higher (e.g., 60 GHz). Unfortunately, signals that are broadcast or transmitted at these higher frequencies suffer substantially greater attenuation—particularly when passing through intervening objects such as walls in a building—compared to signals at lower operating frequencies. As a result, unless transmitter power levels are substantially increased (which is often not permissible), then communication ranges for wireless devices operating at these higher frequencies are substantially reduced.

One solution to mitigate the problems of these higher frequency bands is the use of directional antennas by the wireless devices. As is well known, when the beamwidth of a transmitting or broadcasting antenna pattern is reduced, an antenna gain is achieved which has an effect as if the transmitter power level has been increased. Similarly, when the beamwidth of a receiving antenna pattern is reduced, an antenna gain is achieved which has an effect as if the received power level has been increased. By employing directional antennas with sufficiently narrow beamwidths (i.e., sufficient antenna gains) for transmission and reception, wireless devices are able to operate at higher frequency bands while still maintaining an acceptable communication range.

As one example, new high-speed technologies being developed in the 60 GHz frequency band require antenna gains for both transmission and reception on the order of 10 dBi to provide robust communications. Antenna gains of this magnitude imply the use of relatively highly-directional antennas.

However, a problem arises when wireless devices with such directional antennas operate as a wireless network. In particular, whenever two such wireless devices communicate with each other, there antenna patterns must be directed towards each other. So, the wireless devices must first "find" each other to determine in what direction to point the active antenna pattern before they can establish a directional link and communicate with each other.

In one aspect of the invention, a method is provided for communication by a wireless device in a wireless network. The method comprises setting an antenna pattern of the wireless device to have an omnidirectional antenna pattern, and transmitting a first packet using the omnidirectional antenna pattern. The first packet is transmitted by transmitting a packet preamble sequence by repeating each sample of a synchronization sequence N times (N>1), and transmitting a remainder of the first packet by spreading each sample thereof with a spreading factor P (P>1). The method further comprises setting the antenna pattern of the wireless device to have a directional antenna pattern, and transmitting a second packet using the directional antenna pattern.

In yet another aspect of the invention, a wireless device comprises a receiver, a transmitter, and an antenna system operatively connected to the receiver and transmitter. The antenna system is adapted to selectively operate in an omnidirectional mode having an omnidirectional antenna pattern, and a directional mode having a directional antenna pattern. The wireless device is adapted to execute a wireless device discovery process for discovery by other wireless devices. The discovery process comprises setting the antenna system to have the omnidirectional antenna pattern, and transmitting a first packet using the omnidirectional antenna pattern. The first packet is transmitted by transmitting a packet preamble sequence by repeating each sample of a synchronization sequence N times (N>1), and transmitting a remainder of the first packet by spreading each sample thereof with a spreading factor P (P>1). The wireless device is further adapted to operate in a data communication mode. The data communication mode operation comprises setting the antenna system to have the directional antenna pattern, and transmitting a second packet using the directional antenna pattern.

Figure 1:
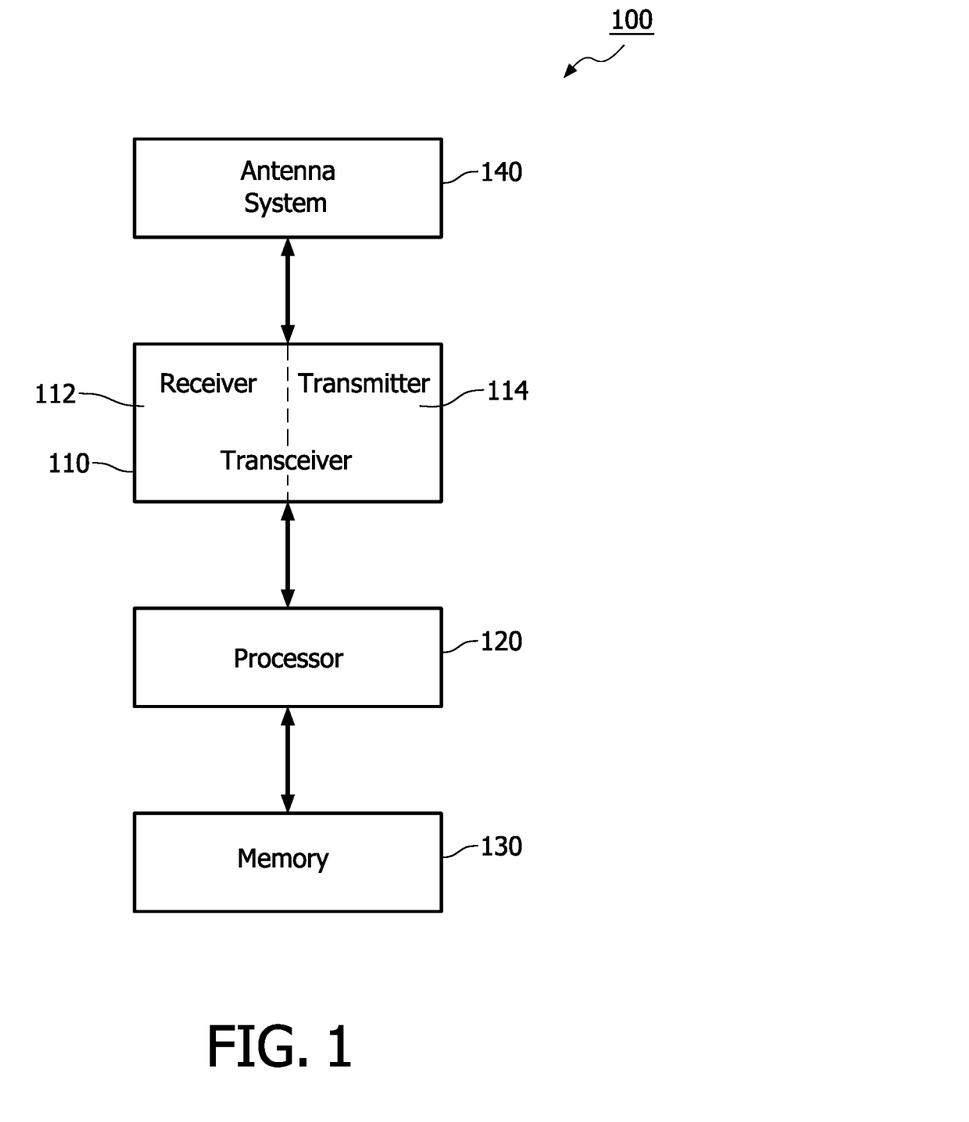
FIG. 1 is a functional block diagram of one embodiment of a wireless device.

FIG. 1 is a functional block diagram of a wireless device 100. As will be appreciated by those skilled in the art, one or more of the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined variously in any physical implementation.

Wireless device 100 includes a transceiver 110, processor 120, memory 130, and a directional antenna system 140.

Transceiver 110 includes a receiver 112 and a transmitter 114, and provides functionality for wireless device 100 to communicate with other wireless devices in a wireless communication network according to the standard protocols of the wireless communication network. For example, in one embodiment wireless device 100 may be a UWB wireless device adapted to operate using a communication protocol according to the WiMedia specifications.

Processor 120 is configured to execute one or more software algorithms in conjunction with memory 130 to provide the functionality of wireless device 100. Beneficially, processor 120 includes its own memory (e.g., nonvolatile memory) for storing executable software code that allows it to perform the various functions of wireless device 100. Alternatively, the executable code may be stored in designated memory locations within memory 130.

Beneficially, antenna system 140 includes an omnidirectional antenna pattern capability and a directional antenna pattern capability. In one embodiment, the directional and omnidirectional capabilities may be provided by some or all of the same components. In another embodiment, these capabilities may be provided by an omnidirectional antenna component and a separate directional antenna component. In one embodiment, the directional antenna component provides a capability for wireless device 100 to select from a plurality of antenna beams for communicating with other wireless devices in a plurality of directions. In one embodiment, antenna system 140 comprises a plurality of antennas each corresponding to one antenna beam. In another embodiment, the directional antenna system component comprises a steerable antenna that can combine a plurality of different antenna elements to form and steer a beam in a desired one of a plurality of different directions.

As mentioned above, when a wireless communication network operates with wireless devices 100 that employ directional antenna patterns, some mechanism must be employed to allow the wireless devices to "discover" and locate each other so that they can direct their antennas towards each other and establish a communication link.

One important solution to this problem is to employ omnidirectional antenna patterns during an initial "device discovery phase," when a wireless device determines where other wireless devices with which it desires to communicate are located, and then once device discovery is complete to switch back to the directional antenna patterns during the subsequent "normal" communication phase.

Figure 2:
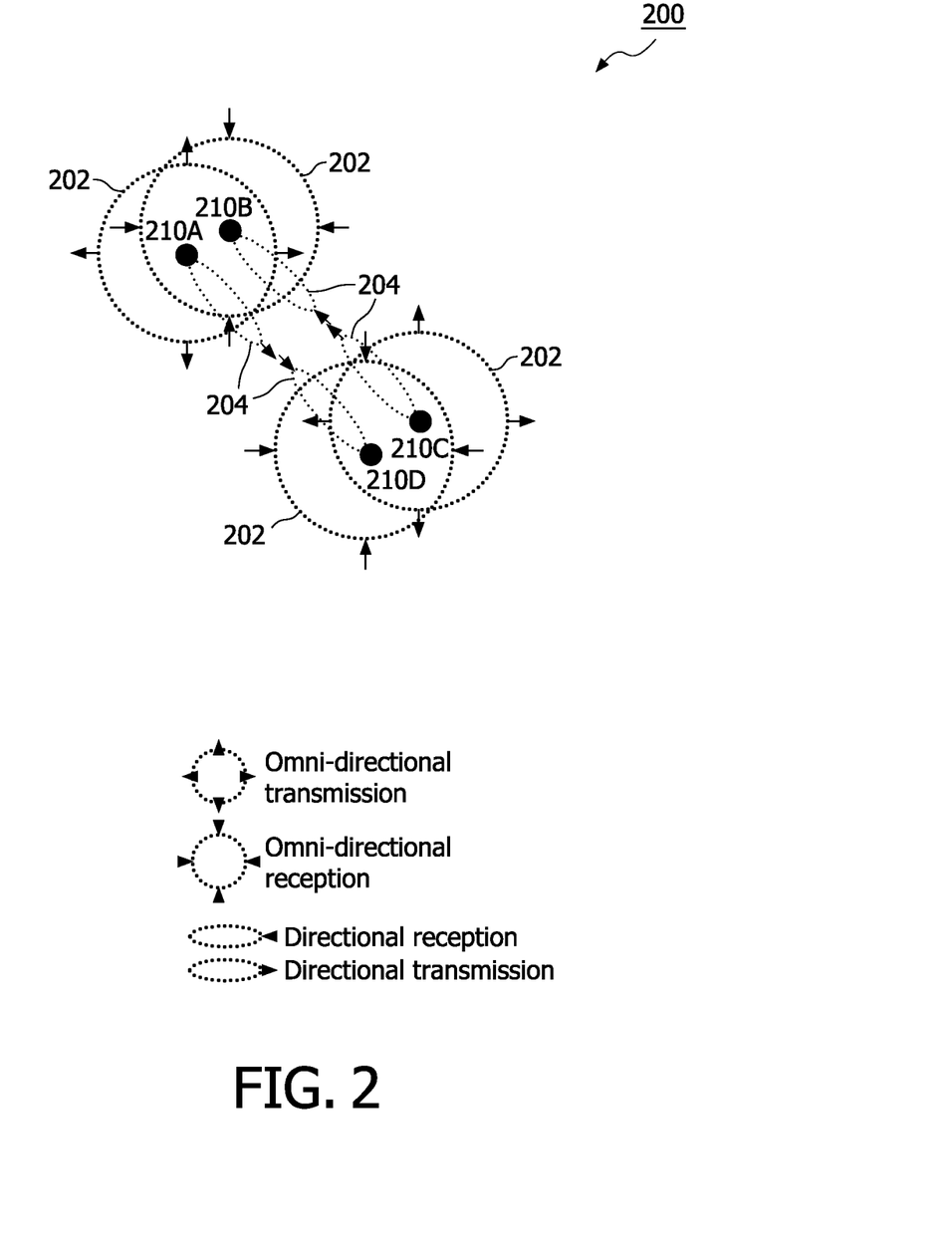
FIG. 2 illustrates a wireless network including wireless devices employing omni-directional antennas and directional antennas.

FIG. 2 illustrates a communication network 200 including wireless devices 210A, 210B, etc. employing omnidirectional antenna patterns 202 and directional antenna patterns 204. As is illustrated in FIG. 2, all of the wireless devices 210A, 210B, 210C and 210D can communicate with each other using directional antenna patterns 204. Also, wireless devices 210A and 210B which are closely located to each other may communicate using omnidirectional antenna patterns 202. Similarly, wireless devices 210C and 210D which are closely located to each other also may communicate using omnidirectional antenna patterns 202.

However, wireless device 210A is unable to communicate with remotely located wireless device 210D using omnidirectional antenna pattern 202. So it is seen that two wireless devices may not be able to communicate with each other using omnidirectional antenna patterns 202, even though they could communicate with each other using directional antenna patterns 204. For example, if wireless devices 210 operate with an antenna gain of 10 dBi gain using directional antenna patterns 204 during "normal" communications, then there will be a total of 20 dB (both sides included) of signal gain that must be recovered somehow during the discovery mode when omnidirectional antenna patterns 202 are employed.

Clearly, this presents an obstacle to employing omnidirectional antenna patterns 202 during the initial "device discovery phase" of wireless communication.

In order to overcome this obstacle, data may be communicated during the wireless device discovery phase with significant redundancy so that the gain of the directional antenna pattern 204 which is lost due to omnidirectional operation can be recovered from the transmitted redundancy. For example, to compensate for the absence of 20 dB of antenna gain (transmit and receive antennas), the data would need to be spread (or repeated) by a factor of approximately 100.

Meanwhile, a typical wireless communication system packet structure includes a predetermined preamble, which is transmitted first, followed by transmission of the remainder of the packet including channel estimation, header, and payload data. The predetermined preamble sequence is known a priori by the receiver at a receiving wireless device, so the receiver may correlate a received signal with the known preamble sequence to synchronize the timing of the receiver to the transmitted signal.

However, spreading the preamble sequence would require a severe increase in the complexity of a correlator that is used at the wireless receiver for synchronization. As an example, if the original segment of a preamble sequence consists of 256 samples, then spreading the preamble by 100 times requires 25,600 delay elements at the receiver for correlation. This is impractical and effectively precludes the use of spreading for transmitting the preamble sequence. However, the remainder of the packet (header and payload) can be spread by a factor of 100, as its detection only requires a length—100 despreader at the receiver.

Accordingly, in one embodiment, during a wireless device discovery phase of communication, a wireless device transmits the preamble sequence differently than the remainder of the packet so as to repeat/spread the preamble sequence in one manner and the remainder of the packet in a different manner. In particular, in one embodiment the preamble sequence may be transmitted using only a narrowband (NB) portion of a communication channel, and the remainder of the packet may be transmitted using the full wideband (WB) bandwidth of the communication channel. In this case, because the receiver operates in a smaller portion of the channel with a reduced bandwidth when detecting the preamble sequence, compared to detecting an equivalent wideband signal which occupies the entire channel, the preamble sequence may be detected with a reduced signal level, thus compensating in whole or in part for the reduced signal level received during omnidirectional operation.

Beneficially, during the device discovery phase, a wireless device transmitting a packet repeats transmission of each sample of a known synchronization sequence N times. Mathematically, this implies:

$$y_{NB}(n) = y_{WB}(\text{floor}(n/N)), n=0,1,\ldots,(N*M-1). \quad (1)$$

where $y_{WB}(n)$ is the original "wideband" predetermined synchronization sequence, M is the length of the synchronization sequence $y_{WB}(n)$, and $y_{NB}(n)$ is the resulting transmitted "narrowband" preamble sequence. If $BW_1$ is the resulting bandwidth of the transmitted preamble sequence $y_{NB}(n)$, and $BW_2$ is the bandwidth that would be employed for transmitting the original "wideband" synchronization sequence $y_{WB}(n)$, then:

$$BW_1 = BW_2/N \quad (2)$$

The transmitter 114 in a wireless device 110 may employ a sample-and-hold unit to produce the narrowband preamble $y_{NB}(n)$, with the spectrum being shaped by the spectrum of a sample-and-hold unit.

In one embodiment, where 20 dB of directional antenna gain must be "replaced" during the device discovery phase using the omni-directional antenna pattern, N can be set equal to 100. In that case, for example, if the bandwidth of the communication channel that is used during normal data communication phase with the directional antenna patterns is defined as $BW_2$, then the bandwidth $BW_1$ of the narrowband (NB) signal can be set to be $BW_2/100$.

Following transmission of the narrowband preamble $y_{NB}(n)$, the wireless device transmits a "full bandwidth" wideband (WB) signal for the remainder of the packet, including the header and payload data. In one embodiment, the WB signal is generated by spreading the header and payload data to the full bandwidth of the channel, as follows:

$$x_{WB}(n) = x(\text{floor}(n/P)) \times v(\text{mod}(n,P)) \quad (3)$$

where $x(n)$ is the original low-rate header and payload data sequence, $v(n)$ is a length-P spreading sequence, and $x_{WB}(n)$ is the full bandwidth spread sequence. With a careful choice for $v(n)$, the remainder of the packet following the narrowband preamble sequence $y_{NB}(n)$ can be made to fill all of nearly all of the bandwidth of the communication channel. Beneficially, in addition to providing processing gain for overcoming gain lost when switching from a directional to an omnidirectional antenna pattern, this also improves the multipath fading immunity of the transmission.

In one embodiment, the length of the spreading sequence, P, is selected to be the same as the number of times, N, that each sample in the narrowband preamble sequence is repeated.

Figure 3:
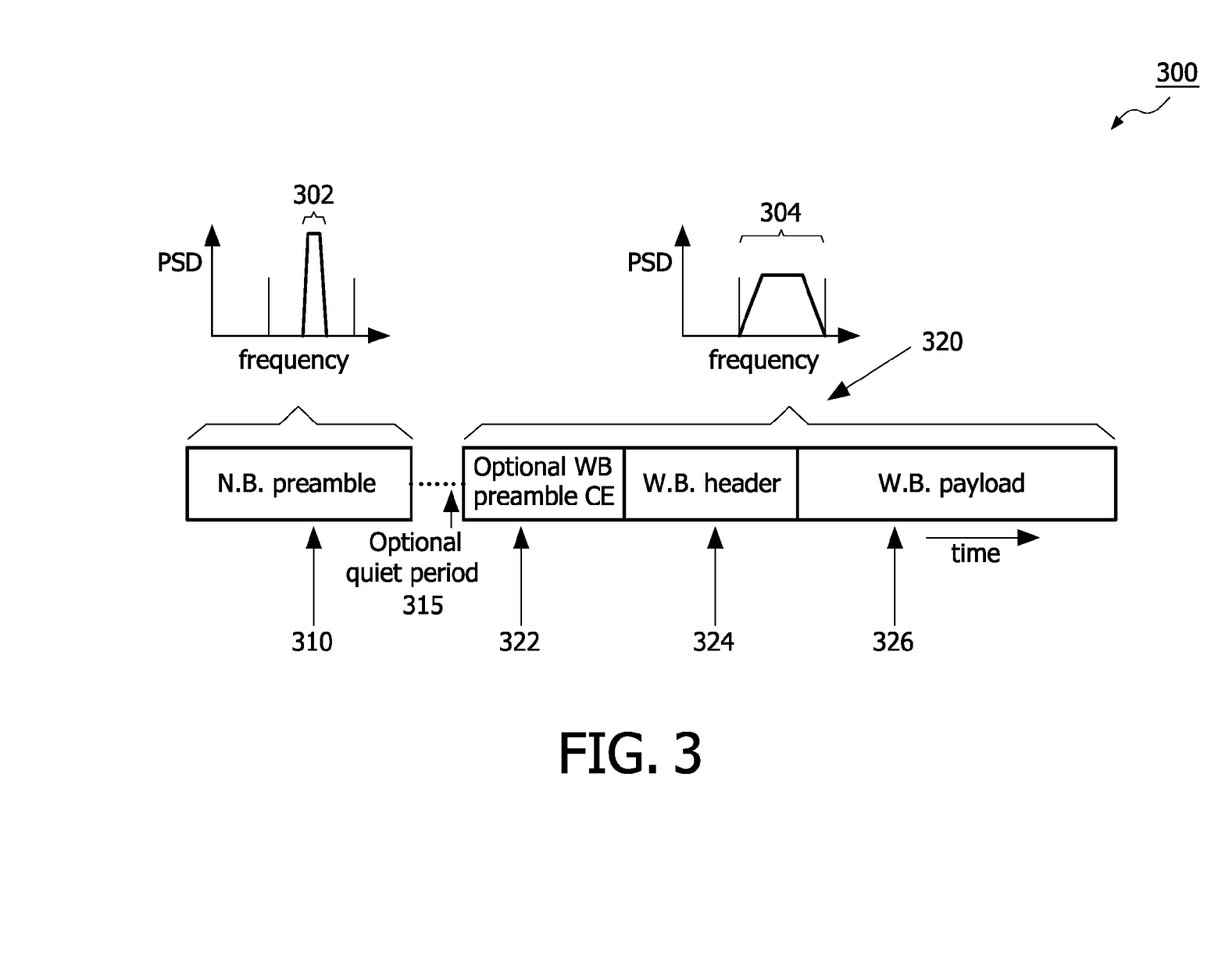
FIG. 3 illustrates one embodiment of a structure of a discovery mode packet, and a frequency domain representation of signals associated with various portions of the packet.

FIG. 3 illustrates one embodiment of a structure of a discovery mode packet 300, and corresponding frequency domain representation of the signals associated with various portions of packet 300, that is transmitted by a wireless device using an omnidirectional antenna during a wireless device discovery process. Packet 300 includes a narrowband preamble 310, which is followed by a remainder 320 of packet 300. The remainder 320 of packet 300 includes an optional wideband preamble 322 (which may be omitted), a wideband header 324, and a wideband payload portion (i.e., payload data) 326. Optionally, a quiet period 315 may be inserted between the narrowband preamble 310 and the remainder 320 of packet 300.

As illustrated in FIG. 3, narrowband preamble 310 comprises the preamble sequence $y_{NB}(n)$ transmitted with a first, narrowband, bandwidth 302 ($BW_{NB}$), while the remainder 320 of packet 300 comprises the header and payload data that is spread to occupy a much wider bandwidth 304 ($BW_{WB}$). $BW_{WB}$ is the full bandwidth of the communication channel as normally used by the wireless device for transmitting packets with the directional antenna pattern during a normal data communication mode (e.g., $BW_{NB}=BW_{WB}/N$, where N represents the number of times that each sample of the preamble sequence $y_{NB}(n)$ is repeated).

The remainder 320 of packet 300 is transmitted using a spreading sequence which spreads the data contained therein with a spreading sequence of length P to compensate for some or all of the gain lost by switching from a directional antenna pattern that is used during normal transmission to the omnidirectional antenna pattern used in the wireless device discovery process. In one beneficial embodiment, the spreading factor, P=N, the number of times that each sample of the preamble sequence is repeated. In that case, all portions of the packet experience the same gain. However, in the embodiment illustrated in FIG. 3, the entire preamble 310 is transmitted in a small portion of the channel, and so is more susceptible to multipath fading than the remainder 320 of packet 300 which occupies a much wider bandwidth.

Accordingly, in another embodiment, a frequency-shifted combination of the preamble sequence may be transmitted to result in a multi-frequency (multi-band) preamble. For example, the preamble sequence may be:

$$\bar{y}_{NB}(n) = y_{NB}(n) * \sum_{k=0}^{Z-1} e^{-j2\pi f_k nT} \quad (4)$$

where $f_k$ is the frequency shift, and T is the sampling interval. In one embodiment, the frequency shift can be implemented in the analog domain. In one embodiment, the frequency shift is affected by a frequency hopping scheme. Such a multi-frequency preamble may improve performance when the communication channel exhibits frequency-selective deep fading over a relatively narrow bandwidth.

Figure 4:
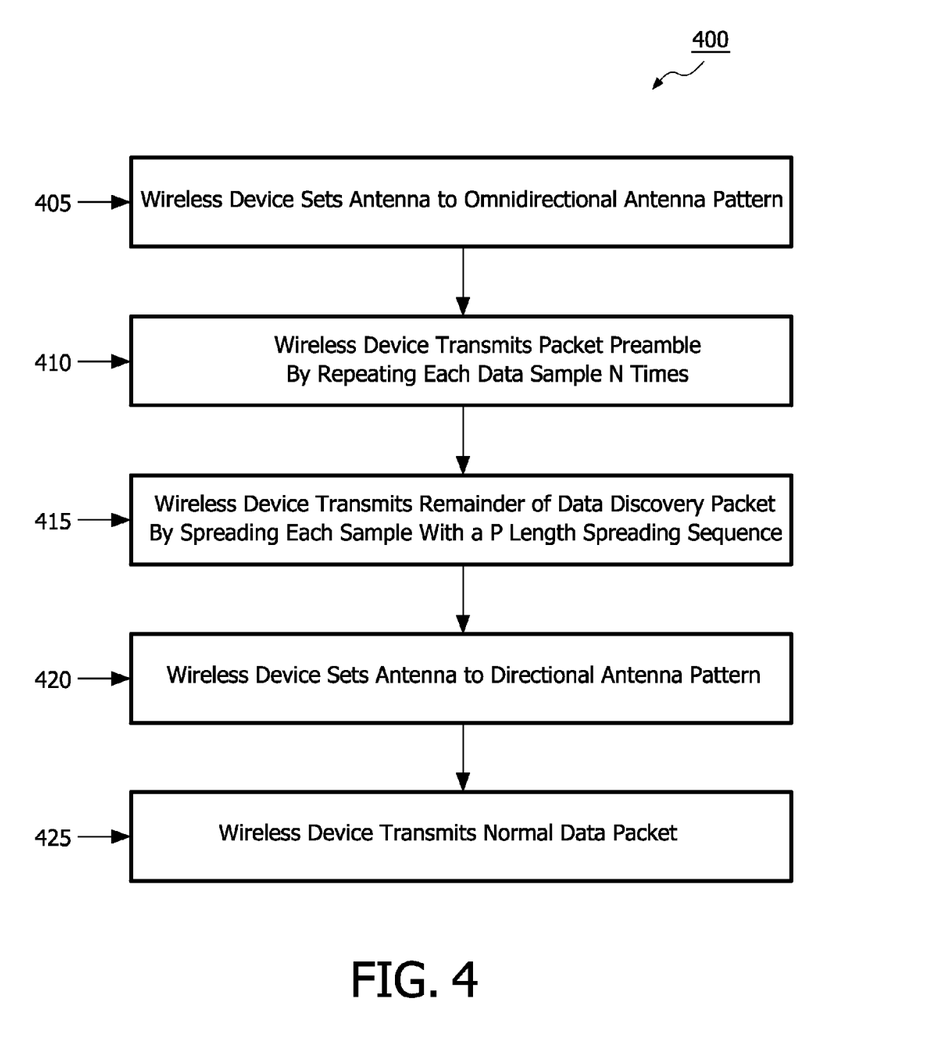
FIG. 4 is a flowchart illustrating one embodiment of a method of wireless device discovery in a communication network wherein the wireless devices employ directional antennas.

FIG. 4 is a flowchart illustrating one embodiment of a method 400 of wireless device discovery in a communication network wherein the wireless devices employ directional antenna patterns for normal data communication, and employ omnidirectional antenna patterns during wireless device discovery. In particular, FIG. 4 illustrates operations at a transmitter 114 of a wireless device 100 during one embodiment of wireless device discovery process, and a data communication.

In a first step 405, a wireless device 100 places itself into a device discovery mode. In that case, it controls antenna system 140 to produce an omnidirectional antenna pattern 202.

In a next step 410, wireless device 100 configures transmitter 114 to transmit a packet preamble sequence 320 of a first (data discovery) packet 300 by repeating each sample of a synchronization sequence N times (N>1).

Then, in a step 415, wireless device 100 configures transmitter 114 to transmit a remainder of the first packet 300 by spreading each sample thereof with a spreading factor P (P>1).

Accordingly, by the process of steps 405-415, a transmitting wireless device 100 employing an omnidirectional antenna pattern 202 can transmit a data discovery packet 300 to a receiving wireless device 100 also employing an omnidirectional antenna pattern 202 to execute a wireless device discovery phase of communication.

Meanwhile, for a normal data communication mode, in step 420 the wireless device 100 places itself into a data communication mode. In that case, it controls antenna system 140 to produce a directional antenna pattern 204.

Then, in a step 425, wireless device 100 transmits a normal data packet using the directional antenna pattern 204.

Figure 5:
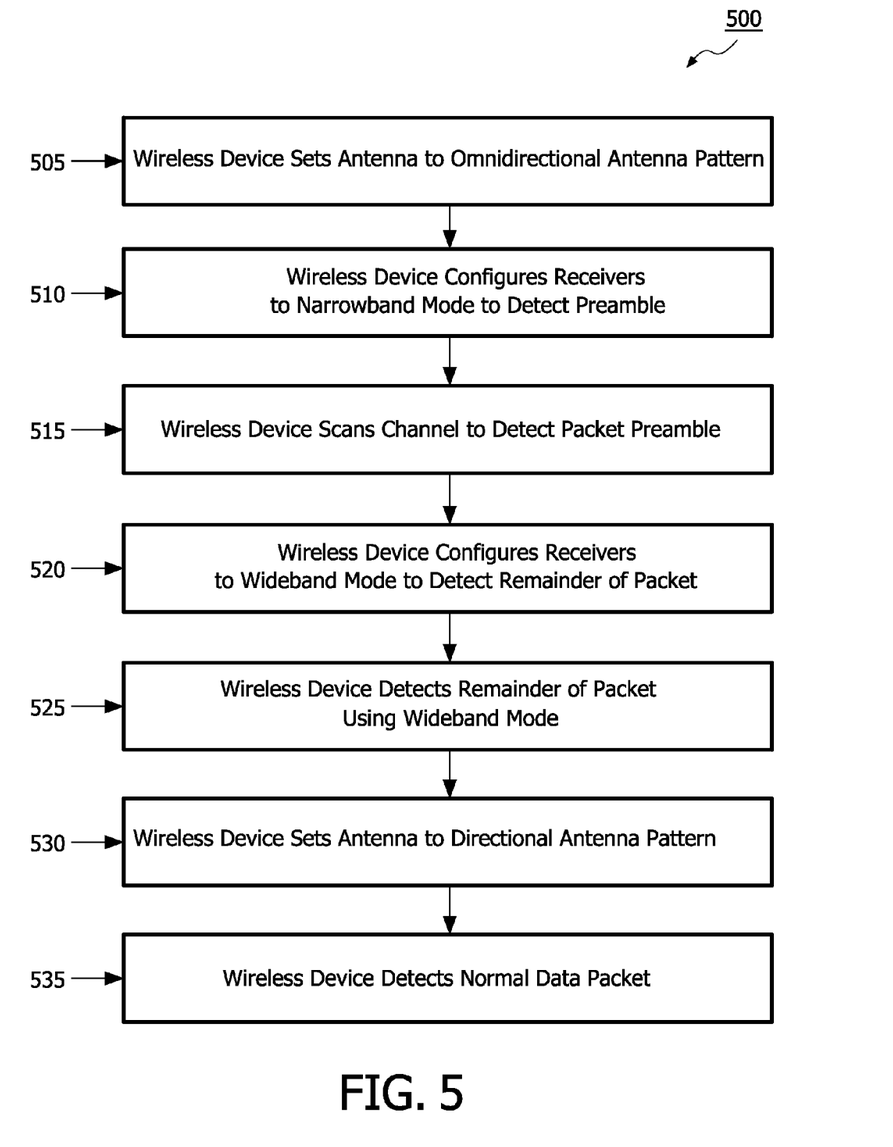
FIG. 5 is a flowchart illustrating another embodiment of a method of wireless device discovery in a communication network wherein the wireless devices employ directional antennas.

FIG. 5 is a flowchart illustrating another embodiment of a method 500 of wireless device discovery in a communication network wherein the wireless devices employ directional antenna patterns for normal data communication, and employ omnidirectional antenna patterns during wireless device discovery. In particular, FIG. 5 illustrates operations at a receiver 112 of a wireless device 100 during one embodiment of wireless device discovery process, and a data communication.

In a first step 505, a wireless device 100 places itself into a device discovery mode. In that case, it controls antenna system 140 to produce an omnidirectional antenna pattern 202.

In a next step 510, wireless device 100 configures receiver 112 to detect a narrowband preamble sequence, $y_{NB}(n)$ which has been generated from a predetermined "wideband" synchronization sequence $y_{WB}(n)$ of a first (discovery mode) packet 300.

In a next step 515, receiver 112 of wireless device 100 scans the communication channel until the synchronization sequence $y_{WB}(n)$ is detected or a timeout occurs. In this step, receiver 112 performs narrow-band processing until the synchronization sequence $y_{WB}(n)$ is detected. In one embodiment, receiver 112 performs matched filtering and sampling on the preamble sequence $y_{NB}(n)$, followed by correlation and detection of the synchronization sequence $y_{WB}(n)$. The correlation and detection of the synchronization sequence $y_{WB}(n)$ is performed at a low bandwidth/speed, thereby eliminating the need to have a large number of delay elements in the correlator of receiver 112.

In a subsequent step 520, if the synchronization sequence $y_{WB}(n)$ is detected in step 515, then wireless device 100 synchronizes its operations to the transmitted signal, using the synchronization sequence, and then changes the configuration of receiver 112 to demodulate the remainder 320 of the packet 300, which has been transmitted using a spreading sequence of length P to spread the signal over a wideband (WB) spectrum. As shown in FIG. 3, the transmitter 114 of the wireless device 100 which transmitted the packet 300 may have inserted an optional quiet period 315 in the packet 300 that is known to the receiver 112. In that case, the receiving wireless device 100 can use this quiet period to reconfigure its receiver 112 and/or processor 120 to operate in the wideband mode.

Once receiver 112 is synchronized to the incoming packet, then in a step 525 it can then de-spread, demodulate and decode the full-bandwidth header and payload data accordingly. The header and/or payload data includes information that allows the receiving wireless device to discover the presence of the transmitting wireless device. This may include data identifying the particular transmitting wireless device and/or the location or direction of the transmitting wireless device. If an optional full-bandwidth preamble 320 is transmitted, then receiver 112 can use this sequence 320 to readjust adjust some receiver parameters, such as gain setting, frequency and timing error calculation, and channel estimation.

Accordingly, by the process of steps 505-525, a receiving wireless device 100 employing an omnidirectional antenna pattern 202 can receive a data discovery packet 300 from a transmitting wireless device 100 also employing an omnidirectional antenna pattern 202 to execute a wireless device discovery phase of communication.

Meanwhile, for a normal data communication mode, in step 530 the wireless device 100 places itself into a data communication mode. In that case, it controls antenna system 140 to produce a directional antenna pattern 204.

Then, in a step 535, wireless device 100 receives a normal data packet using the directional antenna pattern 204.

A number of variations and options are possible with the process described above.

In one embodiment, the whole preamble sequence $y_{NB}(n)$ itself can be repeated K times to increase the chance of correct synchronization.

In one embodiment, a cover sequence may be used when $y_{NB}(n)$ is repeated for several purposes, one of which is a frame delimiter.

The repeating methodology described in the embodiment above to produce $y_{NB}(n)$ is a simple sample-and-hold approach with its corresponding characteristics. However in another embodiment, a different methodology may be used with different frequency characteristics.

In one embodiment, a different mechanism may be employed to spread the data, such as addition of extra error correction bits, or a combination of spreading and additional error correction bits. For error correction, conventional coding techniques such as convolution coding, trellis coding, Reed-Solomon and LDPC coding can be employed.

While preferred embodiments are disclosed herein, many such variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of communication by a wireless device in a wireless network, the wireless device including a transmitter and a receiver, the method comprising:

setting an antenna pattern of the wireless device to have an omnidirectional antenna pattern;

transmitting a first packet using the omnidirectional antenna pattern, wherein transmitting the first packet includes transmitting a preamble sequence of the first packet by repeating each sample of a synchronization sequence N times (N>1), and transmitting a remainder of the first packet by spreading each sample with a spreading factor P (P>1), said preamble sequence having a frequency spectrum with a bandwidth $BW_{NB}$ and said remainder having a frequency spectrum with a bandwidth $BW_{WB}$, where $BW_{NB} < BW_{WB}$;

setting the antenna pattern of the wireless device to have a directional antenna pattern; and transmitting a second packet using the directional antenna pattern.

2. The method of claim 1, wherein $BW_{NB} = BW_{WB}/N$.

3. The method of claim 1, wherein P=N.

4. The method of claim 1, further comprising repeating the at least one portion of the packet preamble sequence K times, where K>1.

5. The method of claim 1, further comprising frequency-shifting the packet preamble sequence prior to transmission to produce a multiband packet preamble sequence.

6. The method of claim 1, further comprising receiving the first packet using the omnidirectional antenna pattern, wherein receiving the first packet includes detecting the preamble sequence using a narrowband processing mode, the preamble sequence including the synchronization sequence having a plurality of samples each of which samples has been repeated N times (N>1), the receiver using the synchronization sequence for synchronizing the receiver to the first packet, and detecting the remainder of the first packet using a wideband processing mode, the remainder of the first packet comprising at least payload data having a plurality of samples each of which samples has been spread by the spreading factor P (P>1) prior to transmission, the receiver despreading the remainder of the packet to detect the payload data;

receiving the second packet using the directional antenna pattern.

7. A wireless device for communication in a wireless network, comprising:

a receiver;

a transmitter; and an antenna system, operatively connected to the receiver and transmitter, for selectively operating in an omnidirectional mode having an omnidirectional antenna pattern and in a directional mode having a directional antenna pattern, wherein the wireless device is discovered by other wireless devices by:

setting the antenna system to have the omnidirectional antenna pattern, transmitting a first packet using the omnidirectional antenna pattern, said transmitting including transmitting a preamble sequence by repeating each sample of a synchronization sequence N times (N>1), and transmitting a remainder of the first packet by spreading each sample thereof with a spreading factor P (P>1), said preamble sequence having a frequency spectrum with a bandwidth $BW_{NB}$ and said remainder having a frequency spectrum with a bandwidth $BW_{WB}$, where $BW_{NB} < BW_{WB}$; and wherein the wireless device operates in a data communication mode by setting the antenna system to have the directional antenna pattern such that a second packet is transmitted using the directional antenna pattern.

8. The wireless device of claim 7, wherein $BW_{NB} = BW_{WB}/N$.

9. The wireless device of claim 7, wherein P=N.

10. The wireless device of claim 7, further comprising repeating the at least one portion of the packet preamble K times, where K>1.

11. The wireless device of claim 7, further comprising frequency-shifting the packet preamble sequence prior to transmission to increase a spectral occupancy of the packet preamble sequence.

12. The wireless device of claim 7, wherein the first packet is received using the omnidirectional antenna pattern by:
- detecting the preamble sequence using a narrowband processing mode, the preamble sequence including a synchronization sequence having a plurality of samples each of which samples has been repeated N times (N>1), the receiver using the synchronization sequence for synchronizing the receiver to the first packet, and
- detecting the remainder of the first packet using a wideband processing mode, the remainder of the first packet including at least payload data having a plurality of samples each of which samples has been spread by the spreading factor P (P>1) prior to transmission, the receiver despreading the remainder of the first packet to detect the payload data; and
- wherein the wireless device operates in a data communication mode by setting the antenna system to have the directional antenna pattern such that the second packet is received using the directional antenna pattern.

* * * * *